US005178669A

United States Patent [19]

Watanabe et al.

[11] Patent Number: 5,178,669

[45] Date of Patent: Jan. 12, 1993

[54] COMPOSITION FOR REVERSIBLE THERMAL RECORDING MEDIA

[75] Inventors: Niro Watanabe; Toyoko Shimizu; Yoshihiro Hino, all of Tokyo, Japan

[73] Assignee: Toppan Printing Co., Ltd., Tokyo, Japan

[21] Appl. No.: 613,874

[22] PCT Filed: Apr. 6, 1990

[86] PCT No.: PCT/JP90/00464

§ 371 Date: Jan. 31, 1991

§ 102(e) Date: Jan. 31, 1991

[87] PCT Pub. No.: WO90/11898

PCT Pub. Date: Oct. 18, 1990

[30] Foreign Application Priority Data

| | | | |
|---|---|---|---|
| Apr. 7, 1989 | [JP] | Japan | 1-89508 |
| Apr. 7, 1989 | [JP] | Japan | 1-89509 |
| Apr. 7, 1989 | [JP] | Japan | 1-89510 |
| May 15, 1989 | [JP] | Japan | 1-120888 |
| Sep. 1, 1989 | [JP] | Japan | 1-228079 |
| Sep. 1, 1989 | [JP] | Japan | 1-228080 |
| Sep. 1, 1989 | [JP] | Japan | 1-228081 |

[51] Int. Cl.$^5$ ........ C09D 11/00; B41M 5/30

[52] U.S. Cl. ........ 106/21 R; 503/217; 503/225

[58] Field of Search ........ 106/21; 503/216, 217, 503/225

[56] References Cited

U.S. PATENT DOCUMENTS

| | | | |
|---|---|---|---|
| 4,028,118 | 6/1977 | Nakasuji et al. | 503/217 |
| 4,097,288 | 6/1978 | Lawton | 106/21 |
| 4,180,405 | 12/1979 | Lawton | 106/21 |
| 4,423,116 | 12/1983 | Fox | 503/217 |
| 4,500,354 | 2/1985 | Katsen et al. | 106/21 |
| 4,513,052 | 4/1985 | Kubo et al. | 106/21 |
| 4,716,424 | 12/1987 | Petitpierre et al. | 503/217 |
| 4,729,983 | 3/1988 | Satake et al. | 503/217 |
| 4,839,332 | 6/1989 | Ikeda et al. | 503/217 |
| 4,918,047 | 4/1990 | Ikeda et al. | 503/216 |
| 4,999,333 | 3/1991 | Usami et al. | 503/217 |

FOREIGN PATENT DOCUMENTS

| | | |
|---|---|---|
| 0097220 | 1/1984 | European Pat. Off. . |
| 50-105555 | 8/1975 | Japan . |
| 242583 | 10/1987 | Japan . |
| 275181 | 11/1989 | Japan . |
| 188293 | 7/1990 | Japan . |
| 188294 | 7/1990 | Japan . |

OTHER PUBLICATIONS

Patent Abstracts of Japan vol. 14, No. 46 (M-926)(3989) 26 Jan. 1990, and JP-A-01 275181 (Oji Paper Co. Ltd) 02 Nov. 1989.

Patent Abstracts of Japan vol. 14 No. 469 (M-1034)(4412) 12 Oct. 1990, and JP-A-02 188294 (Toppan Printing Co. Ltd) 24 Jul. 1990.

Patent Abstracts of Japan vol. 14, No. 469 (M-1034)(4412) 12 Oct. 1990, and JP-A-02 188293 (Toppan Printing Co. Ltd) 24 Jul. 1990.

Patent Abstracts of Japan vol. 12, No. 116 (M-684)(2963) 13 Apr. 1988, 62-24583 (Ricoh Co Ltd) 23 Oct. 1987.

*Primary Examiner*—Mark L. Bell

*Assistant Examiner*—Helene Klemanski

*Attorney, Agent, or Firm*—Armstrong, Westerman, Hattori, McLeland & Naughton

[57] ABSTRACT

A composition for reversible thermal recording media which contains an amphoteric compound having at least one of a phenolic hydroxyl group and a carboxyl group and also having an amino group either as a functional group or as part of a salt compound, and a leuco compound.

15 Claims, No Drawings

COMPOSITION FOR REVERSIBLE THERMAL RECORDING MEDIA

TECHNICAL FIELD

This invention relates to a composition for image forming materials and, more particularly, to a composition for reversible thermal recording media that form or erase images depending upon the difference in thermal energy.

BACKGROUND ART

Various reversible image forming materials have hitherto been disclosed in many references including Unexamined Published Japanese Patent Application Nos. 191190/1983, 193691/1985, U.S. Pat. No. 3,666,525, Unexamined Published Japanese Patent Application Nos. 119377/1979, 39377/1988, 41186/1988, U.S. Pat. No. 4,028,118, and Unexamined Published Japanese Patent Application Nos. 81157/1975 and 105555/1975.

Among the methods disclosed in these references, those which are disclosed in U.S. Pat. No. 4,028,118, as well as Unexamined Published Japanese Patent Application Nos. 81157/1975 and 105555/1975 have had the disadvantage that the image formed will vary with temperature and hence is unsatisfactory in terms of memory quality. The image forming materials described in Unexamined Published Japanese Patent Application Nos. 191190/1983, 193691/1985, and U.S. Pat. No. 3,666,525 comprise a recording layer composed of a color former, a color developer and a binder, with a low vapor-pressure solvent or a heat-fusible material added as required. In those image-forming materials, color is formed using thermal energy and erased with the aid of water, water vapor or a certain kind of organic solvent and, hence, the mechanism involved differs from the one which accomplishes cyclic color formation and erasure solely by controlling thermal energy.

The image forming materials described in Unexamined Published Japanese Patent Application Nos. 119377/1979, 39377/1988 and 41186/1988 have a heat-sensitive layer that is chiefly composed of a resin matrix and an organic low-molecular weight material dispersed in said resin matrix. The recording method they adopt depends on the control of thermal energy, which causes reversible changes in the transparency of the heat-sensitive layer to form and erase images. This is not a method of forming and erasing images by chemical color formation and erasure.

As described above, there has been no prior art system that is capable of chemical color formation and erasure solely by controlling thermal energy and which has already been practiced commercially.

An object, therefore, of the present invention is to provide a reversible thermal recording medium that has not been proposed in the prior art and which has memory quality in that it is capable of chemically forming or erasing color solely by controlling thermal energy, as well as a composition suitable for use in that medium.

DISCLOSURE OF THE INVENTION

The present inventors conducted intensive studies under the circumstances described above and found that the aforementioned object of the invention could be attained by providing a composition for reversible thermal recording media that contained an amphoteric compound having at least one of a phenolic hydroxyl group and a carboxyl group and also having an amino group either as a functional group or as part of a salt compound, and a leuco compound, particularly in the case where said amphoteric compound was a compound that had at least one of a phenolic hydroxyl group and a carboxyl group and an amino group and which is represented by the following general formula (1), or a salt or a complex salt of a compound having at least one phenolic hydroxyl group and/or a carboxyl group with an aliphatic amine:

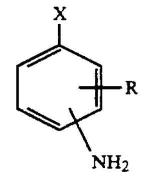
[1]

(where X is a hydroxyl group or a carboxyl group, and R is a hydrogen atom or a hydroxyl group).

Preferred examples of the amphoteric compound to be used in the present invention which has at least one of a phenolic hydroxyl group and a carboxyl group and which also has an amino group either as a functional group or as part of a salt compound include a compound that has at least one of a phenolic hydroxyl group and a carboxyl group and an amino group and which is represented by the general formula (1) shown above, and a salt or a complex salt of a compound having at least one phenolic hydroxyl group and/or a carboxyl group with an aliphatic amine.

Preferred examples of the amphoteric compound that has at least one of a phenolic hydroxyl group and a carboxyl group and an amino group and which is represented by the general formula (1) shown above include an aminophenol or aminobenzoic acid represented by the following general formula (2), and a hydroxyaminobenzoic acid represented by the following general formula (3):

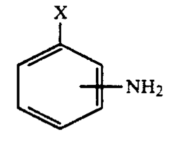
[2]

(where X is a hydroxyl group or a carboxyl group);

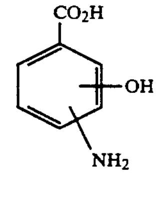
[3]

Specific examples of the aminophenol and aminobenzoic acid represented by the general formula (2) shown above include: aminophenols such as 2-aminophenol, 3-aminophenol and 4-aminophenol; and aminobenzoic acids such as 2-aminobenzoic acid, 3-aminobenzoic acid, 4-aminobenzoic acid, etc.

Examples of the hydroxyaminobenzoic acid represented by the general formula (3) include 2-hydroxy-3-aminobenzoic acid, 2-amino-3-hydroxybenzoic acid, 2-amino-4-hydroxybenzoic acid, 2-hydroxy-4-aminobenzoic acid, 2-hydroxy-6-aminobenzoic acid, 3-amino-4-hydroxybenzoic acid, 3-hydroxy-5-aminobenzoic acid, etc.

In the case where a compound having at least one phenolic hydroxyl group and/or a carboxyl group forms a salt or a complex salt with an aliphatic amine, preferred examples of the compound having at least one phenolic hydroxyl group and/or a carboxyl group include compounds represented by the following general formula (A) or (B), as well as ester compounds of these compounds:

[A]

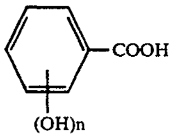

(where n is an integer of 1–3, preferably 2 or 3);

[B]

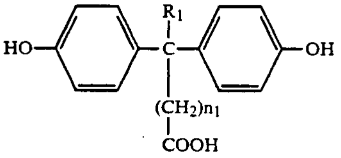

(where $R_1$ is a hydrogen atom or a methyl group, and $n_1$ is an integer of 0–6).

Specific examples of the compound represented by the general formula (A) shown above are listed below:

n=1:
- 2-hydroxybenzoic acid, 3-hydroxybenzoic acid, 4-hydroxybenzoic acid, etc.

n=2:
- 3,4-dihydroxybenzoic acid
- 3,5-dihydroxybenzoic acid
- 2,3-dihydroxybenzoic acid
- 2,4-dihydroxybenzoic acid
- 2,5-dihydroxybenzoic acid
- 2,6-dihydroxybenzoic acid
- 3,6-dihydroxybenzoic acid
- 4,5-dihydroxybenzoic acid
- 4,6-dihydroxybenzoic acid
- 4-hydroxysalicylic acid
- 5-hydroxysalicylic acid, etc.

n=3: gallic acid, etc.

Specific examples of the ester compound of the compound represented by the general formula (A) shown above include hexyl gallate, heptyl gallate, octyl gallate, nonyl gallate, decyl gallate, undecyl gallate, lauryl gallate, tridecyl gallate, tetradecyl gallate, pentadecyl gallate, cetyl gallate, heptadecyl gallate, stearyl gallate, etc.

Specific examples of the compound represented by the general formula (B) shown above are listed below:

2,2-bis(4-hydroxyphenyl)ethanoic acid
2,2-bis(4-hydroxyphenyl)propionic acid
3,3-bis(4-hydroxyphenyl)propionic acid
4,4-bis(4-hydroxyphenyl)butanoic acid
4,4-bis(4-hydroxyphenyl)heptanoic acid
5,5-bis(4-hydroxyphenyl)pentanoic acid
5,5-bis(4-hydroxyphenyl)hexanoic acid
6,6-bis(4-hydroxyphenyl)heptanoic acid
7,7-bis(4-hydroxyphenyl)heptanoic acid
8,8-bis(4-hydroxyphenyl)octanoic acid
7,7-bis(4-hydroxyphenyl)octanoic acid
8,8-bis(4-hydroxyphenyl)nonanoic acid.

Examples of the aliphatic amine which may be used in the present invention to form the aforementioned salt or complex salt include compounds represented by the following general formula (C) or (D):

$$R_2NH_2 \quad [C]$$

(where $R_2$ is an alkyl group having at least 8 carbon atoms);

[D]

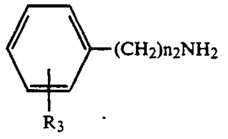

(where $R_3$ is a hydrogen atom, an alkyl group, a halogen atom or an alkoxy group, and $n_2$ is an integer of 1–18).

Specific examples of the aliphatic amine represented by the general formula (C) shown above include octylamine, nonylamine, decylamine, undecylamine, laurylamine, tridecylamine, tetradecylamine, pentadecylamine, heptadecylamine, cetylamine, stearylamine, hexylamine, heptylamine, etc. Specific examples of the aliphatic amine represented by the general formula (D) shown above include benzylamine, 2-phenylethylamine, 3-phenylpropylamine, 4-phenylbutylamine, 5-phenylpentylamine, 6-phenylhexylamine, 7-phenylheptylamine, 8-phenyloctylamine, 9-phenylnonylamine, 10-phenyldecylamine, 11-phenylundecylamine, 12-phenyldodecylamine, 13-phenyltridecylamine, 14-phenyltetradecylamine, 15-phenylpentadecylamine, 16-phenylhexadecylamine, 17-phenylheptadecylamine, 18-phenyloctadecylamine, methylbenzylamine, 2-triethylamine, 3-tolylpropylamine, 4-tributylamine, 5-tolylpentylamine, 6-trihexylamine, 7-tolylheptylamine, 8-tolyloctylamine, 9-tolylnonylamine, 10-tolyldecylamine, 11-tolylundecylamine, 12-tolyldodecylamine, 13-tolyltridecylamine, 14-tolyltetradecylamine, 15-tolylpentadecylamine, 16-tolylhexadecylamine, 17-tolylheptadecylamine, 18-tolyloctadecylamine, chlorobenzylamine, 2-chlorophenylethylamine, bromobenzylamine, 2-bromophenylethylamine, methoxybenzylamine, ethoxybenzylamine, etc.

If $R_2$ in the general formula (C) shown above has no more than 7 carbon atoms, the melting point of the compound will increase and an undesirable effect will occur in that difficulty is encountered with erasing the color formed.

Preferred examples of the salt or complex salt described above which may be used in the present invention include: a salt of a dihydroxybenzoic acid and a higher aliphatic amine having an alkyl group with at least 8 carbon atoms, as represented by the following general formula (4); a salt of gallic acid and a higher aliphatic amine, as represented by the following general formula (5); a salt of hydroxybenzoic acid or dihydroxybenzoic acid and an aliphatic amine, as represented by the following general formula (6); a salt of gallic acid and an aliphatic amine, as represented by the following general formula (7); a salt of bis(hydroxyphenyl)acetic acid or bis(hydroxyphenyl) butyric acid and a higher aliphatic amine, as represented by the following general formula (8); a salt of an aliphatic carboxylic acid having two hydroxyphenyl groups and an aliphatic amine, as represented by the following general formula (9); and a complex salt of a gallic acid ester and a higher aliphatic amine, as represented by the following general formula (10);

[4]

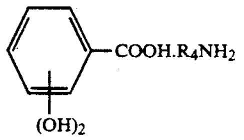

(where $R_4$ is an alkyl group having at least 8 carbon atoms);

[5]

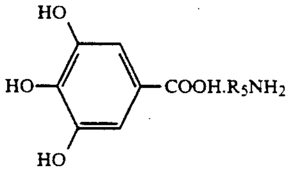

(where $R_5$ is an alkyl group having at least 8 carbon atoms);

[6]

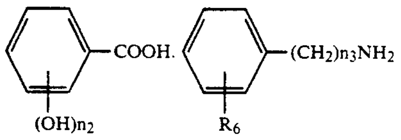

(where $R_6$ is a hydrogen atom, an alkyl group, a halogen atom or an alkoxy group; $n_2$ is 1 or 2; and $n_3$ is an integer of 1-18);

[7]

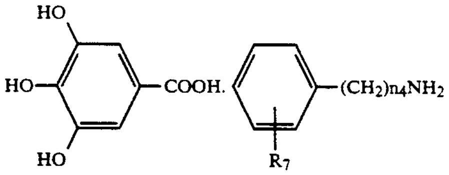

(where $R_7$ is a hydrogen atom, an alkyl group, a halogen atom or an alkoxy group; and $n_4$ is an integer of 1-18);

[8]

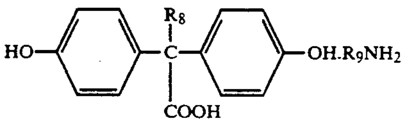

(where $R_8$ is a hydrogen atom or a methyl group, and $R_9$ is an alkyl group having at least 8 carbon atoms);

[9]

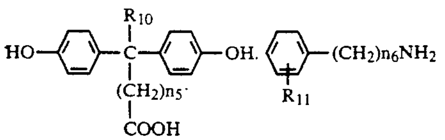

(where $R_{10}$ is a hydrogen atom or a methyl group; $R_{11}$ is a hydrogen atom, an alkyl group, a halogen atom or an alkoxy group; $n_5$ is an integer of 0-6; and $n_6$ is an integer of 1-18); and

[10]

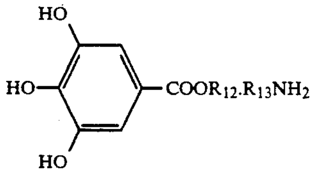

(where $R_{12}$ and $R_{13}$ are each an alkyl group having at least 8 carbon atoms).

Specific examples of the leuco compound that is used with the amphoteric compound described above in the composition of the present invention include: crystal violet lactone, 3-indolino-3-p-dimethylaminophenyl-6-dimethylaminophthalide, 3-diethylamino-7-chlorofluoran, 2-(2-fluorophenylamino)-6-diethylaminofluoran, 2-(2-fluorophenylamino)-6-di-n-butylaminofluoran, 3-diethylamino-7-cyclohexylaminofluoran, 3-diethylamino-5-methyl-7-t-butylfluoran, 3-diethylamino-6-methyl-7-anilinofluoran, 3-diethylamino-6-methyl-7-p-butylanilinofluoran, 3-cyclohexylamino-6-chlorofluoran, 2-anilino-3-methyl-6-(N-ethyl-p-toluidino)-fluoran, 3-pyrrolidino-6-methyl-7-anilinofluoran, 3-pyrrolidino-7-cyclohexylaminofluoran, 3-N-methylcyclohexylamino-6-methyl-7-anilinofluoran, 3-N-ethylpentylamino-6-methyl-7-anilinofluoran, etc.

The composition of the present invention may further contain a binder, which may be selected from among commonly employed polymeric materials that dissolve in water or organic solvents. Specific examples of such polymeric materials that can be used include polyvinyl alcohol, methyl cellulose, ethyl cellulose, cellulose acetate, polystyrene, polyvinyl chloride, linear saturated polyesters, homo- or copolymers of methacrylic resins such as poly(methyl methacrylate) and poly(ethyl methacrylate), and thermoplastic resins such as polyurethane, polybutyral, nitrocellulose, etc.

The preferred contents of the above-described components in the composition of the present invention are such that it contains 0.1-1 part by weight of the leuco compound and up to 2 parts by weight of the binder per part by weight of the amphoteric compound of the present invention.

When the composition of the present invention is used to form a reversible thermal recording medium, a recording layer may typically be coated on a support by the following procedure: a binder is dissolved in a coating liquor which is a uniform dispersion or solution in water or an organic solvent; if necessary, a thickener as an agent to improve the properties of the liquor, a white pigment or a like is added to prepare a coating liquor for recording layer; it is then applied to a support such as paper, a plastic film or sheet by a coating method such as bar coating, blade coating, air-knife coating, gravure coating or roll coating, and the applied liquor is dried to form a recording layer. In this instance, an advantageous coating weight is 4–10 $g/m^2$ on a dry basis.

The recording layer on the support which is composed of the leuco compound, the amphoteric compound of the present invention and the binder may be overlaid with a protective layer for the purpose of improving the match with a thermal head (i.e., resistance to deposition or sticking of tailings on the thermal head) or imparting durability to the recording layer without impairing any of the characteristics of the recording material of the present invention. Exemplary components to be used in the protective layer are combinations of fillers such as colorless inorganic pigments or waxes with thermoplastic resins used in the binder in said recording layer, or thermosetting resins or uv curable resins.

The method of forming an image or erasing it in accordance with the present invention relies upon heat and may be implemented using a suitable apparatus such as a thermal printer, a heat reflective copier, a hot stamper or heated rolls.

The reversible thermal recording medium formed from the composition of the present invention performs recording, namely, image formation and erasure, by the following principles. Upon application of thermal energy, a phenolic compound opens the lactone ring in a colorless leuco compound and causes a color change (allows the colorless leuco compound to turn chromatic). However, the organic compound formed by opening the lactone ring will undergo ring closure upon contact with a basic material and returns to the initial colorless compound having the lactone ring. The amphoteric compound having at least one of a phenolic hydroxyl group and a carboxyl group and also having an amino group either as a functional group or as part of a salt compound, namely, the color developing and reducing agent of the present invention, is capable of opening the lactone ring in a colorless leuco compound to form a chromatic compound or closing the lactone ring to allow the chromatic compound to return to the initial colorless leuco compound merely by controlling thermal energy. This phenomenon is attributable to the structure of the color developing and reducing agent and the reversible nature of the leuco compound. To state more specifically, the color developing and reducing agent is an amphoteric compound as described above and, under the action of heat, it exhibits the nature of either an acid or a base to work either as a color developing agent or as a color reducing agent with respect to the leuco compound.

Upon application of thermal energy (h1) which may consist of heating at an elevated temperature (≧300° C.) for a short period (a few milliseconds to several hundreds of milliseconds), the recording material having a recording layer composed of the composition of the present invention containing a colorless leuco compound and the color developing/reducing agent will form a chromatic image as the result of reaction between the phenolic hydroxyl group or carboxyl group with the leuco compound. The formed image can be erased under the action of an amino group by application of another thermal energy (h2) which may consist of heating at a low temperature (a temperature close to or above the melting point of the color developing/reducing agent, say, ca. 100°–200° C.) for a long period (≧1 second) and an image can be formed again by another application of thermal energy (h1) to the image-forming material from which the image has been erased. This cycle of image formation and erasure can be repeated. The image formed on the image-forming material is retained or it remains absent from the latter unless no thermal energy is applied. The background from which image has been erased is by no means inferior to the state of the background before the image was formed and, hence, provides an excellent reversible recording medium.

BEST MODE FOR CARRYING OUT THE INVENTION

Examples are hereunder given to describe the present invention in a specific way. The "parts" in these examples are "parts by weight".

EXAMPLE 1

Solution A

Crystal violet lactone

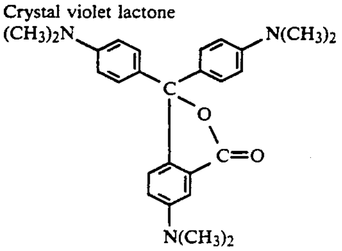

10 parts

Methacrylic resin 5 parts
(Paraloid A-11, trademark of Rohm & Hass Company)
Toluene 40 parts Solution B Color developing/reducing agent of the invention

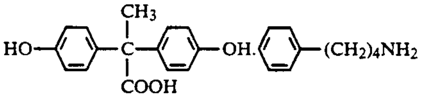

10 parts

Methacrylic acid 7.5 parts
(Paraloid A-11 of Rohn & Haas Company)
Toluene 40 parts The above-described components, solutions A and B, were individually pulverized and dispersed with sand mills for 1 h and, thereafter, the resulting dispersions were mixed thoroughly (one part of solution A mixed with four parts of solution B) to prepare a coating liquor for a recording layer. This coating liquor was applied onto a sheet of wood-free paper (60 $g/m^2$) with a Mayer bar to give a dry weight of 6 $g/m^2$ and dried to fabricate a reversible thermal recording sheet 1 having no background fogging.

Thermal recording sheets 2–9 were fabricated by repeating the procedure of fabricating the thermal recording sheet 1 except that the color developing/reducing agent of the present invention is solution B was replaced by the compounds shown in Table 1.

In the fabrication of thermal recording sheet 9, 4,4'-isopropylidenephenol was further added in 5 parts to solution B.

Printing was done on each of the thus fabricated recording sheets 1–9 using a thermal simulator of Toshiba Corp. (printing conditions: voltage applied, 0.40 W/dot; pulse width, 2.5 ms ON/OFF); as a result, a sharp and high-density blue image could be printed in all recording sheets. Subsequently, each of the sheets was pressed with a hot stamper (120° C.) for one second, whereupon the printed image was erased and the recording layer returned to the initial state. Another printing and erasure cycle was performed in a similar manner and the result was satisfactorily reproducible, establishing the fact that the samples fabricated were outstanding as reversible thermal recording media.

TABLE 1

| No. | Color developing/reducing agent |
|---|---|
| 1 | 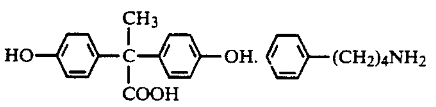 |
| 2 | 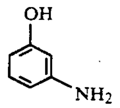 |
| 3 | 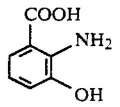 |
| 4 | 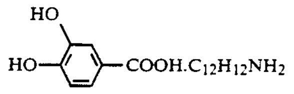 |
| 5 | 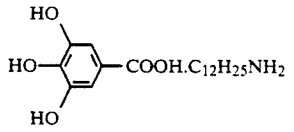 |
| 6 | 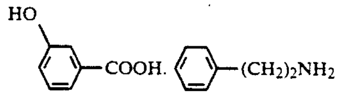 |
| 7 | 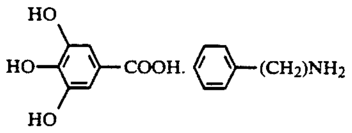 |
| 8 | 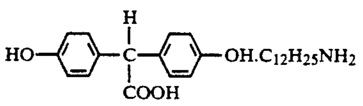 |
| 9 | 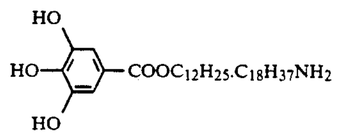 |

EXAMPLE 2

Solution A

| | |
|---|---|
| 2-(2-Chlorophenylamino)-6-diethyl-aminofluoran 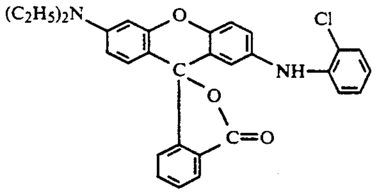 | 10 parts |
| Polyvinyl alcohol | 2 parts |
| Water | 40 parts |

Solution B

| | |
|---|---|
| Color developing/reducing agent of the invention 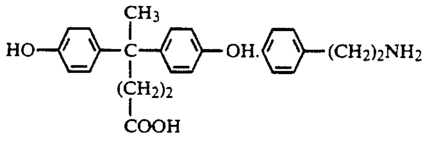 | 10 parts |
| Calcium carbonate | 10 parts |
| Polyvinyl alcohol | 10 parts |
| Water | 10 parts |

The above-described components, solutions A and B, were individually pulverized and dispersed with sand mills for 20 h. Thereafter, the resulting dispersions were mixed thoroughly (two parts of solution A mixed with five parts of solution B) to prepare a coating liquor for recording layer. This coating liquor was applied onto a sheet of wood-free paper (60 g/m$^2$) with a Mayer bar to give a dry weight of 6 g/m$^2$ and dried to fabricate a reversible thermal recording sheet 11 having no background fogging.

Thermal recording sheets 12-19 were fabricated by repeating the procedure of fabricating the thermal recording sheet 11 except that the color developing/reducing agent of the present invention in solution B was replaced by the compounds shown in Table 2.

In the fabrication of the thermal recording sheet 19, 4,4'-methyl-bis(hydroxyphenyl)acetate was further added in 8 parts to solution B.

Each of the thus fabricated recording sheets 11-19 was subjected to repeated cycles of printing and erasure as in Example 1 to evaluate their effectiveness. Good printing and erasing quality was obtained as in Example 1 and the results were also satisfactorily reproducible.

The only exception was that the sharp and high-density prints were black in color.

TABLE 2

| No. | Color developing/reducing agent |
|---|---|
| 11 | 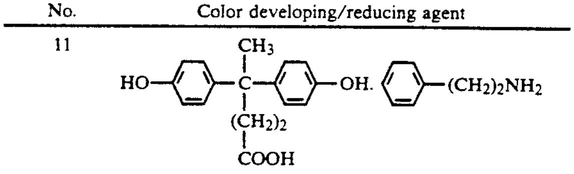 |

TABLE 2-continued

| No. | Color developing/reducing agent |
|---|---|
| 12 | 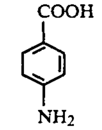 |
| 13 | 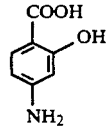 |
| 14 | 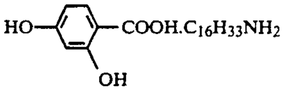 |
| 15 | 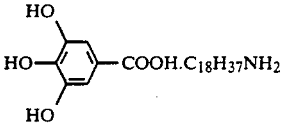 |
| 16 | 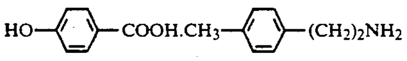 |
| 17 | 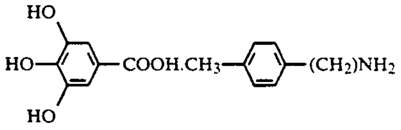 |
| 18 | 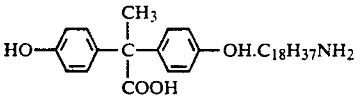 |
| 19 | 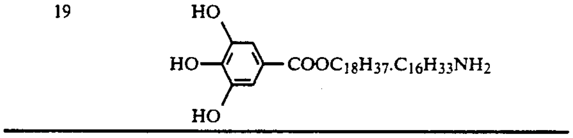 |

EXAMPLE 3

Solution A

| | |
|---|---|
| 3-N-Methylcyclohexylamino-6-methyl-7-anilinefluoran 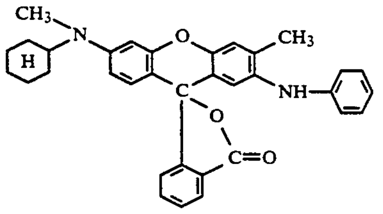 | 10 parts |
| Vinyl chloride-vinyl acetate copolymer (Eslex A of Sekisui Chemical Co., Ltd.) | 5 parts |
| Toluene | 30 parts |
| Methyl ethyl ketone | 10 parts |

Solution B

| | |
|---|---|
| Color developing/reducing agent of the invention 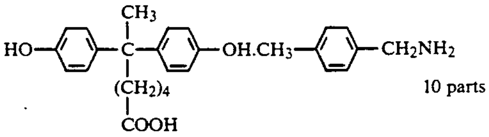 | 10 parts |
| Saturated polyester resin (Vylon 200 of Toyobo Co., Ltd.) | 10 parts |
| Toluene | 30 parts |
| Methyl ethyl ketone | 10 parts |

Solution C

| | |
|---|---|
| Methacrylic resin (BR-60 of Mitsubishi Rayon Co., Ltd.) | 10 parts |
| Calcium carbonate | 10 parts |
| Toluene | 40 parts |

The above-described components, solutions A, B and C, were individually pulverized and dispersed with sand mills for 2 h. Thereafter, the resulting dispersions were mixed thoroughly (three parts of solution mixed with twenty parts of solution A) to prepare a coating liquor for recording layer.

This coating liquor was applied onto a white polyester sheet (188 μm) with a bar coater to give a dry film thickness of 6 μm and dried to form a recording layer. Then, dispersed solution C was applied onto the recording layer with a bar coater to give a dry film thickness of 3 μm and dried to form a protective layer, whereby a reversible thermal recording sheet 101 was fabricated. This recording sheet had a high degree of whiteness without background fogging.

Additional thermal recording sheets 102–109 were fabricated by repeating the procedure of fabricating the thermal recording sheet 101 except that the color developing/reducing agent of the present invention in solution B was replaced by the compounds shown in Table 3.

In the fabrication of the thermal recording sheet 109, stearyl gallate was further added in 4 parts to solution B.

Printing was done on each of the thus fabricated recording sheets 101–100 using a thermal simulator of Toshiba Corp. (printing conditions: voltage applied, 0.45 W/dot; pulse width, 2.5 ms ON/OFF); as a result, a sharp and high-density (reflection density: 1.5) black image could be printed in all recording sheets. Subsequently, each of the printed recording sheets was passed through a hot roll press having a roll temperature of 130° C., whereupon the printed image was erased and the recording layer turned to the initial state. Another printing and erasure cycle was performed in a similar manner and the result was satisfactorily reproducible, establishing the fact that the samples fabricated were outstanding as reversible thermal recording media.

TABLE 3

| No. | Color developing/reducing agent |
|---|---|
| 101 | 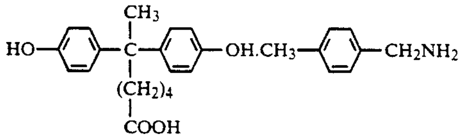 |
| 102 | 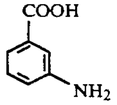 |
| 103 | 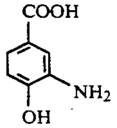 |
| 104 | 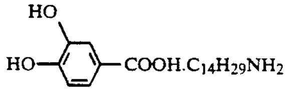 |
| 105 | 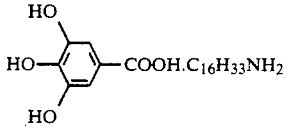 |
| 106 | 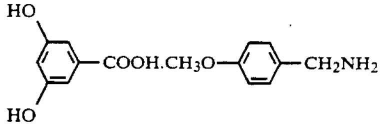 |
| 107 | 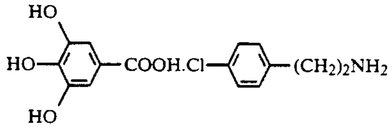 |
| 108 | 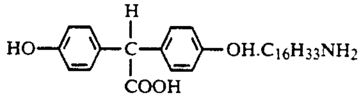 |
| 109 | 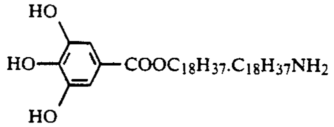 |

The reversible thermal recording medium prepared from the composition of the present invention is capable of forming or erasing image in a simple way solely by controlling thermal energy; in other words, it is a system capable of chemical color formation and erasure. Accordingly, this medium is capable of forming a high-contrast and sharp image and various colors can be produced by changing the type of leuco compound used.

Further, the cycles of image formation and erasure can be repeated.

INDUSTRIAL APPLICABILITY

Thus, the composition for reversiable thermal recording media of the present invention can be used not only as displays and electronic blackboards but also as cards and balance display media such as prepaid cards that must be protected from forgery. In a particular application, the composition may be printed or otherwise coated on a commuter's pass and is allowed to form and erase color when the commuter enters and leaves a station, whereby illegal admission can be prevented.

We claim:

1. A composition for reversible thermal recording media which contains an amphoteric compound having at least one of a phenolic hydroxyl group and a phenolic carboxyl group and also having an $NH_2$ group either as a functional group or as part of a salt compound, and a leuco compound.

2. A composition for reversible thermal recording media according to claim 1 wherein said amphoteric compound has at least one of a phenolic hydroxyl group and a carboxyl group, and an $NH_2$ group, which compound is represented by the following general formula (1):

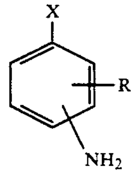

(1)

where X is a hydroxyl group or a carboxyl group; and R is a hydrogen atom or a hydroxyl group.

3. A composition for reversible thermal recording media according to claim 2 wherein said amphoteric compound is an aminophenol or an aminobenzoic acid which are represented by the following general formula (2):

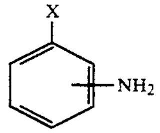

(2)

where X is a hydroxyl group or a carboxyl group.

4. A composition for reversible thermal recording media according to claim 2 wherein said amphoteric compound is a hydroxy-aminobenzoic acid represented by the following general formula (3):

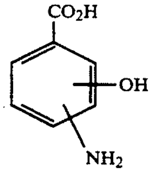

(3)

5. A composition for reversible thermal recording media according to claim 1 wherein said amphoteric compound is a salt or a complex salt of a compound having at least one phenolic hydroxyl group and/or a phenolic carboxyl group with an aliphatic primary amine.

6. A composition for reversible thermal recording media according to claim 5 wherein said compound having at least one phenolic hydroxyl group and/or a carboxyl group is one member selected from among compounds represented by the following general formula (A) or (B) and ester compounds of these compounds:

(A)

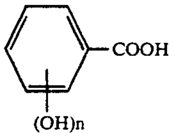

where n is an integer of 1-3;

(B)

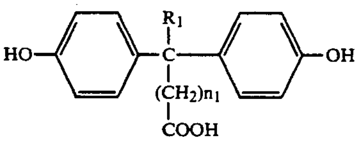

where $R_1$ is a hydrogen atom or a methyl group, and $n_1$ is an integer of 0-6.

7. A composition for reversible thermal recording media according to claim 5 wherein said aliphatic amine is one member selected from among compounds represented by the following general formula (C) or (D):

$R_2NH_2$ [C]

where $R_2$ is an alkyl group having at least 8 carbon atoms;

(D)

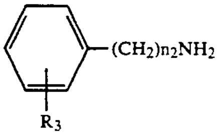

where $R_3$ is a hydrogen atom, an alkyl group, a halogen atom or an alkoxy group; and $n_2$ is an integer of 1-18.

8. A composition for reversible thermal recording media according to claim 5 wherein said amphoteric compound is a salt of di-hydroxybenzoic acid and a higher aliphatic amine having at least 8 carbon atoms, as represented by the following general formula (4):

(4)

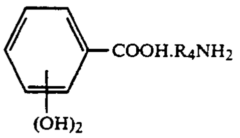

where $R_4$ is an alkyl group having at least 8 carbon atoms.

9. A composition for reversible thermal recording media according to claim 5 wherein said amphoteric compound is a salt of gallic acid and a higher aliphatic amine, as represented by the following general formula (5):

(5)

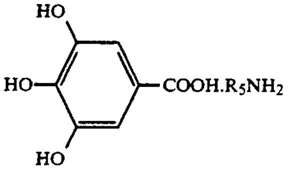

where $R_5$ is an alkyl group having at least 8 carbon atoms.

10. A composition for reversible thermal recording media according to claim 5 wherein said amphoteric compound is a salt of hydroxybenzoic acid or dihydroxybenzoic acid and an aliphatic amine, as represented by the following general formula (6):

(6)

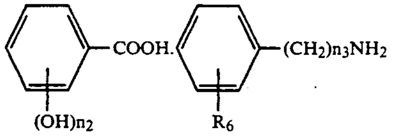

where $R_6$ is a hydrogen atom, an alkyl group, a halogen atom or an alkoxy group; $n_2$ is 1 or 2; and $n_3$ is an integer of 1-18.

11. A composition for reversible thermal recording media according to claim 5 wherein said amphoteric compound is a salt of gallic acid and an aliphatic amine, as represented by the following general formula (7):

(7)

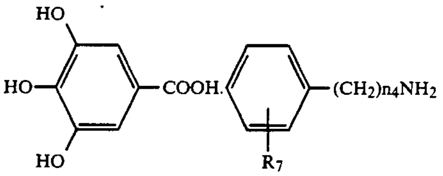

where $R_7$ is a hydrogen atom, an alkyl group, a halogen atom or an alkoxy group; and $n_4$ is an integer of 1-18.

12. A composition for reversible thermal recording media according to claim 5 wherein said amphoteric compound is a salt of bis(hydroxyphenyl)acetic acid or bis(hydroxyphenyl)butyric acid and a higher aliphatic amine, as represented by the following general formula (8):

(8)

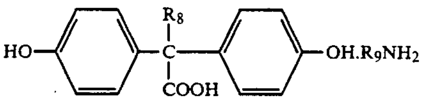

where $R_8$ is a hydrogen atom or a methyl group; and $R_9$ is an alkyl group having at least 8 carbon atoms.

13. A composition for reversible thermal recording media according to claim 5 wherein said amphoteric compound is a salt of an aliphatic carboxylic acid having two hydroxyphenyl groups and an aliphatic amine, as represented by the following general formula (9):

(9)

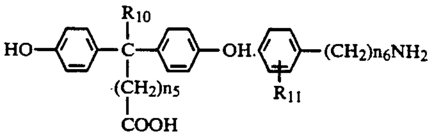

where $R_{10}$ is a hydrogen atom or a methyl group; $R_{11}$ is a hydrogen atom, an alkyl group, a halogen atom or an alkoxy group; $n_5$ is an integer of 0-6; and $n_6$ is an integer of 1-18.

14. A composition for reversible thermal recording media according to claim 5 wherein said amphoteric compound is a complex salt of a gallic acid ester and a higher aliphatic amine, as represented by the following general formula (10):

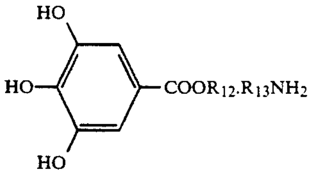
(10)
where $R_{12}$ and $R_{13}$ are each an alkyl group having at least 8 carbon atoms.
15. A composition for reversible thermal recording media according to claim 1 which further contains a binder.
* * * * *
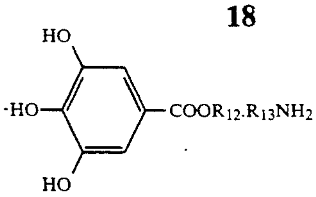
(10)
where $R_{12}$ and $R_{13}$ are each an alkyl group having at least 8 carbon atoms.
15. A composition for reversible thermal recording media according to claim 1 which further contains a binder.
* * * * *